US006931392B1

(12) United States Patent
Skeen

(10) Patent No.: US 6,931,392 B1
(45) Date of Patent: Aug. 16, 2005

(54) REAL-TIME DECISION SUPPORT SYSTEM

(75) Inventor: Marion D. Skeen, Palo Alto, CA (US)

(73) Assignee: Vitria Technology, Inc., Sunnyvale, CA (US)

( * ) Notice: Subject to any disclaimer, the term of this patent is extended or adjusted under 35 U.S.C. 154(b) by 965 days.

(21) Appl. No.: 09/206,663

(22) Filed: Dec. 7, 1998

(51) Int. Cl.[7] ............................................. G06F 17/30
(52) U.S. Cl. ....................... 707/3; 706/59; 395/500.27
(58) Field of Search ................................ 707/2, 3, 4, 8, 707/104; 345/333; 706/59; 395/500.27

(56) References Cited

U.S. PATENT DOCUMENTS

| | | | |
|---|---|---|---|
| 5,331,543 A | | 7/1994 | Yajima et al. |
| 5,339,392 A | * | 8/1994 | Risberg et al. ............. 345/333 |
| 5,596,502 A | * | 1/1997 | Koski et al. ........... 364/468.01 |
| 5,802,256 A | * | 9/1998 | Heckerman et al. .......... 706/59 |
| 5,818,737 A | * | 10/1998 | Orr et al. ............... 395/500.27 |
| 5,822,749 A | * | 10/1998 | Agarwal ........................ 707/2 |
| 5,918,225 A | * | 6/1999 | White et al. .................... 707/3 |
| 5,966,531 A | * | 10/1999 | Skeen et al. ................ 395/683 |
| 6,029,176 A | * | 2/2000 | Cannon ...................... 707/104 |
| 6,029,179 A | * | 2/2000 | Kishi ......................... 707/202 |
| 6,092,066 A | * | 7/2000 | Ofek ............................ 707/10 |
| 6,226,629 B1 | * | 5/2001 | Cossock ......................... 707/3 |
| 2002/0038228 A1 | | 3/2002 | Waldorf et al. |
| 2002/0091989 A1 | | 7/2002 | Cole et al. |

FOREIGN PATENT DOCUMENTS

| | | |
|---|---|---|
| EP | 0 438 168 A2 | 7/1991 |
| WO | WO 00/72183 A2 | 11/2000 |
| WO | WO 01/27762 A1 | 4/2001 |
| WO | WO 01/75747 A1 | 10/2001 |

* cited by examiner

Primary Examiner—Charles Rones
(74) Attorney, Agent, or Firm—Marc S. Kaufman; Nixon Peabody, LLP

(57) ABSTRACT

A computer-implemented real-time decision support system including means for receiving complex queries posed by a plurality of users; means for providing for each of the queries an executable query process furnishing a result when data sources satisfy constraints of the query; means for providing data sources, the data sources including an event source; means for responding to an event furnished by an event source to initiate execution of all query processes having constraints satisfied by data sources; and means for furnishing results of executed query processes to users.

20 Claims, 4 Drawing Sheets

REAL-TIME DECISION SUPPORT SYSTEM

BACKGROUND OF THE INVENTION

1. Field of the Invention

This invention relates to information-sharing systems and, more particularly, to event-driven systems for providing continuous responses to multisource real-time queries.

2. History of the Prior Art

Running a business requires that information be available to persons with many different needs. For example, a wholesale business orders goods from many different manufacturers; warehouses the goods purchased at different places, often in different environments; receives orders arriving at many different times from many different customers situated in many different places; arranges to receive payments in many different ways; ships products to customers using many different shipping channels; and tracks accounts relating to these suppliers and customers. A shipping clerk needs entirely different information relating to a particular item of goods than a warehouse supervisor, a purchasing agent, or a tax accountant even though all of these persons work for the same wholesale business.

The personnel of a business typically satisfy their needs for information by searching for that information in a relational database. A relational database stores historical data in multiple tables in the long term memory of a computer. Personnel typically enter the data from summations into computer displayed forms provided by the database program. The database program stores the data entered in the appropriate tables. Each table includes rows of records with many different fields each holding information defining the record. The different tables in a relational database often have one or more fields which are identical to fields in other tables and provide a link by which data in one table may be related to data in another table.

When an employee of a business desires information to carry out a particular job, the employee directs a query to the database. Such a query causes the software to select information from one or a number of different tables, often to manipulate that information in some manner, and to return the results of the query to the employee, often in some form of report. A query allows an employee to provide very complicated criteria to the database accessing software. The response to a query can thus include result from very sophisticated manipulations of the historical data which has been entered into the database.

Because of this, queries to a typical database may be devised to provide the particular information that each individual employee needs. Because queries may be so personalized, hundreds and often thousands of different individual queries are likely to be submitted continuously to a database in a large business. Each time an employee needs information from a database on which to base a decision, the employee must submit a new query even though the query may be identical to a query previously submitted by that employee. Each individual query is run to completion by the computer executing the database software. As a business grows larger, queries tend to occupy more and more of the time available to the computer running the database. In fact, a large relational database may often become unable to respond effectively to the business queries it receives regarding historical information in the database.

Although many business operations are satisfied by the historical data provided by a typical relational database and are able to cope with slow access speeds, there are any number of processes in a business which only function optimally if those making decisions about the processes are provided immediately with the results of continuously changing events affecting the processes. Manufacturing processes are typical of operations which require real-time monitoring. Manufacturing processes, however, are so important that they are usually handled by computer systems dedicated to the individual processes.

Other important processes have not been so well treated by prior art support systems. Many other business processes benefit greatly if business decisions can be made in real time in response to real-time events. For example, if a business furnishes trucks to pick up the goods it purchases, a last minute change in the number of items which have been purchased requiring a larger truck will require the additional expense of an extra trip if not discovered before a first truck has been dispatched. The availability of real-time information can determine whether many businesses are profitable or not.

A typical relational database is not suited to produce up-to-date results from continually changing data. A database usually contains only historical data. Consequently, the entire design of databases has been organized to optimize the processes by which the many tables of large databases are searched in response to individual queries devised by a large variety of employees to provide this historical data to users.

Although relational databases have some functions which allow responses to real-time events, these functions are so limited in nature that they do not provide a useful solution where real-time decisions are necessary. For example, some databases provide what are referred to as triggers. A trigger can be coded into the software to run a process in response to some change which occurs to some data in the database. Such a process must be precoded into the software and is not subject to immediate change to suit changing circumstances. Moreover, trigger processes cannot be used on a large scale to respond to real-time events. A trigger process runs serially like other processes on the computer. Consequently, if constantly occurring trigger processes were to be used for a variety of purposes, the entire database would simply slow to a halt.

Another type of system for providing information is referred to as an event service. A method used by event systems to respond to real-time events involves what are called filters or event processing. Filters are used to look for the occurrence of events which meet particular criteria. However, filters used by prior art event services are able to respond only to criteria which exist in the event itself and cannot provide more sophisticated functions.

For example, if an event indicates that a package is arriving from a manufacturer containing an amount of some goods, only the data actually in the event can be utilized by the filter. The manufacturer, the goods, the amount of goods, and the time of arrival can be provided to persons interested in the results of the filter, but no other information already in any database can be associated with the event data by the filter. None of the sophisticated processes available to a database such as relating values in different tables which pertain to the package can be carried out. No historical data related to the manufacturer, the goods, or the amounts of the goods can be determined.

Thus, a filter could not be used to determine whether an additional truck was necessary in the previously-mentioned case because historical data could not be combined with event data by an event service.

There are at present no systems for providing immediate results to multi-dimensional sophisticated queries for events occurring in real time. It is desirable to provide such systems.

SUMMARY OF THE INVENTION

It is an object of the present invention to provide a real-time decision support system.

This and other objects of the present invention are accomplished by a computer-implemented real-time decision support system including means for receiving complex queries posed by a plurality of users; means for providing for each of the queries an executable query process furnishing a result when data sources satisfy constraints of the query; means for providing data sources, the data sources including an event source; means for responding to an event furnished by an event source to initiate execution of all query processes having constraints satisfied by data sources; and means for furnishing results of executed query processes to users.

These and other features of the invention will be better understood by reference to the detailed description which follows taken together with the drawings in which like elements are referred to by like designations throughout the several views.

Notation and Nomenclature

Figure 1:
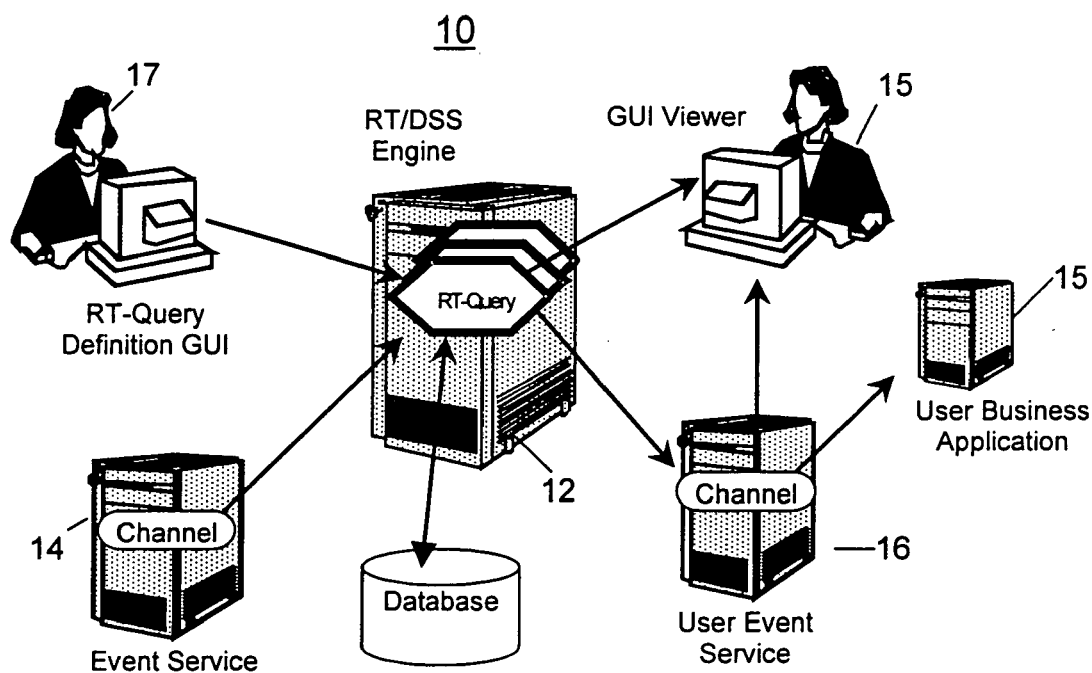
FIG. 1 is a diagram illustrating a real-time decision support system designed in accordance with the present invention.

The detailed description which follows utilizes a number of terms which will be better understood from the following definitions.

Attribute—a field within a data record or event.

Brute Force Algorithm—the simplest algorithm for the continuous and incremental evaluation of queries in accordance with the invention. This algorithm always yields the correct result, but often in an inefficient manner.

Complex query—a multi-variate query or a univariate query.

Constant constraint—a query constraint that compares an attribute to a numeric or string constant.

Continuous query—a query whose result is incrementally re-evaluated after every data change as reported by an event, also known as a real-time query.

Constraint—a query constraint.

Constraint index—an index structure over a given attribute's constant or set inclusion constraints over a set of queries.

Data source—a source of data for a query. For a real-time query, a data source can be either a table within a relational database, a collection within an object-oriented database, or a stream of events from an event service, inter alia.

Decision tree—a computational structure that specifies the order in which to evaluate a series of constraints.

Discrimination network—a computational structure that efficiently tests the satisfaction of a set of queries through the use of index structures and decision trees.

Event—a message reporting a change in the value of one or more attributes of a data record.

Event Service—a system capable of grouping events by data source and delivering them to information consumers, asynchronously and in near real-time.

Event source—a stream of events reporting changes in an underlying data source for a query.

From-clause—a clause within a query that specifies its data sources.

Historical data—stored data.

Incremental query—a query whose results are incrementally re-evaluated and reported after one or more changes to its underlying data sources.

Incremental result optimizations—optimizations for speeding the computation of the incremental change in a query's result based on the receipt of one or more events.

Index attribute—an attribute used as the basis for building an index structure.

Join constraint—a query constraint that relates an attribute in one data source to an attribute in another data source.

Multi-query optimizations—query optimizations that speed the constraint satisfaction testing over a set of queries by considering the interrelationships among the constraints of the queries.

Multi-variate query—a real-time query that has two or more event sources.

Normal form query—a query with no "or" expressions in its where-clause.

Null query—a query whose result contains no data.

Query constraint—an elementary expression within the where-clause of a query that specifies a condition that must be satisfied.

Query satisfaction testing—determining whether a given data record or event satisfies the constraints expressed in the where-clause of a query. Also known simply as satisfaction testing.

Range constraint—a pair of values specifying a constant range of values within which an attribute lies.

Reference source—a data source that changes slowly.

Real-time query—a query whose result is incrementally re-evaluated after every data change reported by an event. Also known as a continuous query.

Relevant query—a query is said to be "relevant" to an event if that event's type or source is specified in the query's from-clause and, hence, that event may affect the result of that query.

Result-clause—a clause within a query that specifies the form of the result of a query.

Select-clause—a result-clause.

Selectivity—indicates the "uniqueness" of a given attribute by computing the ratio of distinct values of an attribute to the size of the entire collection.

Set inclusion constraint—a query constraint that relates an attribute to a set of values.

Simple query—a real-time query that contains a single independent data source in its from-clause.

Single-query optimizations—optimizations applied to the processing of a given query independent of other queries in a system.

Univariate query—a real-time query that has exactly one event source, and may have one or more reference sources.

Where-clause—a clause within a query that specifies the constraints that a data record or event must satisfy in order to be included within the result of the query.

DETAILED DESCRIPTION

FIG. 1 is a diagram illustrating a real-time decision support system 10 designed in accordance with the present invention. The system 10 includes a computer 12 executing real-time decision support software. The computer 12 receives input events from any of a number of sources exemplified in the figure by an event service 14. One such event service included in a preferred embodiment of the invention is described in detail in U.S. patent application Ser. No. 08/818,355, entitled Event Driven Communication System, Skeen et al, filed Mar. 17, 1997, assigned to the assignee of the present invention. Such a service is capable of publishing data changes conveyed in asynchronous messages called "events" to subscribers in near real time (or "business real time" as it is sometimes called) which is essentially the time required by a computing system to post the data over various communication channels supported by the event service.

The event service described in the above patent application is an event-driven (or publish-subscribe) communications system in which data changes are published to subscribers at the time the changes occur. A consumer subscribes to a channel; and whenever data are published on the channel, the channel passes the published data to each of the subscribers to that channel. Publication of data to subscribers requires no explicit action by a subscriber in order to receive the data. A single publication from a publishing source to a channel publishes the data to all subscribers no matter how many subscribers are to receive the data. A single channel may receive data from a plurality of publishers and make the data available to a plurality of subscribers.

Publish-subscribe communications are asynchronous and thus allow a publisher or a subscriber to be on-line as it desires. If a subscriber disconnects in some embodiments, the subscriber may resubscribe and receive all of the data which it missed up to some prescribed amount determined by the retention policy of the channel. A failure of equipment used by a subscriber has no effect on the service. Event-driven communications provide essentially immediate data when an event creating the data occurs. A publish-subscribe system also permits periodic publication of data changes. Because of these facilities, such systems are especially useful for both furnishing real-time data to a real-time decision support system 10 and for publishing the results provided by queries posed to a decision support system by users of the system. While publish-subscribe is utilized for event service 14 in the preferred embodiment, there are many other ways known to those skilled in the art to accomplish the delivery of sequences of events which are within the teaching of the present invention (e.g., asynchronous messages delivered by message-oriented middleware).

The decision support system software executing on the computer 12 receives queries from users 17 which describe one or more results in which the users are interested which may be affected by events which the decision support system receives. The decision support system receives the events as they occur, computes results caused by the events asked for by the queries to the decision support system, stores the results in a plurality of collections (or tables) if necessary, and publishes the results of queries to users. Users may be individuals who have proposed individual queries to the decision support system, event services described above which publish results to a plurality of users, business applications which utilize results from the real-time decision support system, or combinations of any of these.

Although the decision support system 10 includes collections designed somewhat like those of relational databases known to the prior art, the decision support system itself is like no known system. More particularly, whereas a relational database is designed to search its tables as quickly as possible in response to individual queries posed sequentially, the decision support system of the present invention is organized to respond simultaneously to all queries which are affected by each sequentially received event. That is, if an event is received by the real-time decision support system, results for all queries affected by that event are computed and sent to all users who have posed the queries.

Because the preferred embodiment of the invention utilizes an event service 16 such as that described above, any number of users 15 may subscribe to preexisting channels (called "named views") upon which the results of particular long standing queries are posted. Thus, any number of users desiring answers to the same query may immediately receive the result as it changes. This makes the invention particularly useful for users in the same occupational categories.

The decision support system is also especially adept at allowing users 17 to prepare queries especially suited to their individual needs. As designed, the invention allows any number of ad hoc queries to be posed to the decision support system at any time while the system is executing. The results of ad hoc queries may be sent directly to the user posing the query instead of through an event service.

In a preferred embodiment, this feature is facilitated by the use of a query language also used by the above described event service for allowing the connection of subscribers to channels, a language especially designed to be easily understood and used. This language is used by a user to query the decision support system and describes the results which the user desires to receive. In one embodiment, queries are structured in object query language (OQL), *The Object Database Standard: ODMG-93*, R. G. G. Cattell (ed.), 1994, Morgan Kaufmann) especially designed for its ease of use and portability. In a preferred embodiment, the entire real-time decision support system is developed utilizing object based languages conforming to *Common Object Request Broker: Architecture and Specification* (CORBA), Version 2, July 1995, published by the Object Management Group (OMG), which, among other things, defines protocols useful for establishing event-driven communications. This facilitates the transfer of event data and the results provided by the decision support system between systems based on different protocols.

Figure 3:
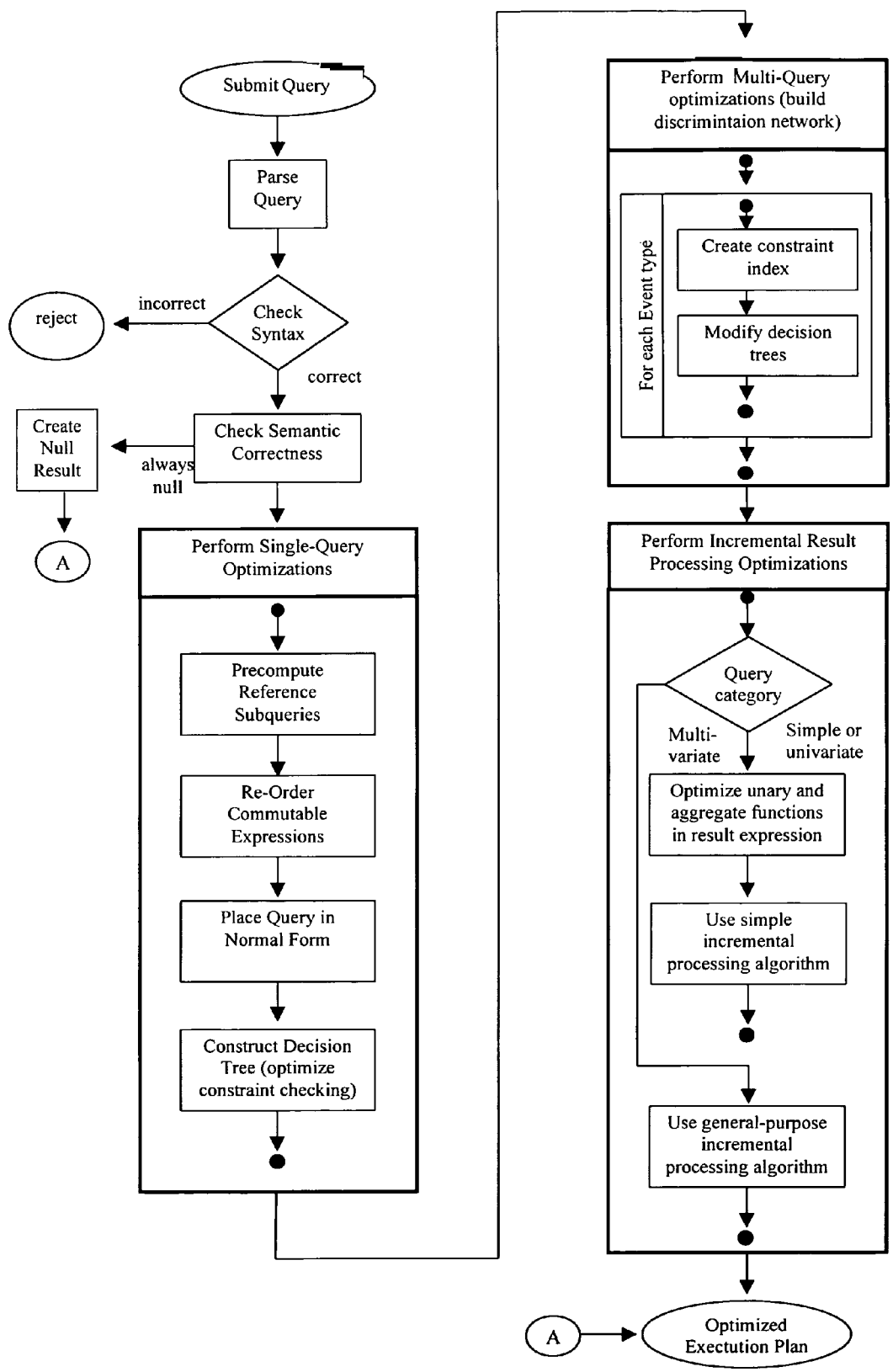
FIG. 3 is a flow diagram illustrating an embodiment of one particular query optimization process of the present invention.

The real-time decision support system of the present invention continuously processes queries in response to incremental changes reported by the events which the system receives from the event service 14 or other source of event data. One problem with all prior art systems which support decision making is an inability to process queries continuously in an efficient manner. To accomplish efficient continuous query processing, one embodiment of the invention optimizes query execution in two ways. First, it builds data structures that select those queries which may be impacted by specific inbound events. These data structures are used to select the queries to execute. The second kind of optimization determines how to run each of the queries and all of the queries together. The invention determines the best process to run for each query when there is a change that may impact the query. Each of these optimizations may include precomputing operations on reference collections as will be described below. FIG. 3 is a flow chart illustrating an embodiment of the process for optimizing the queries of the system 10 described above.

Figure 2:
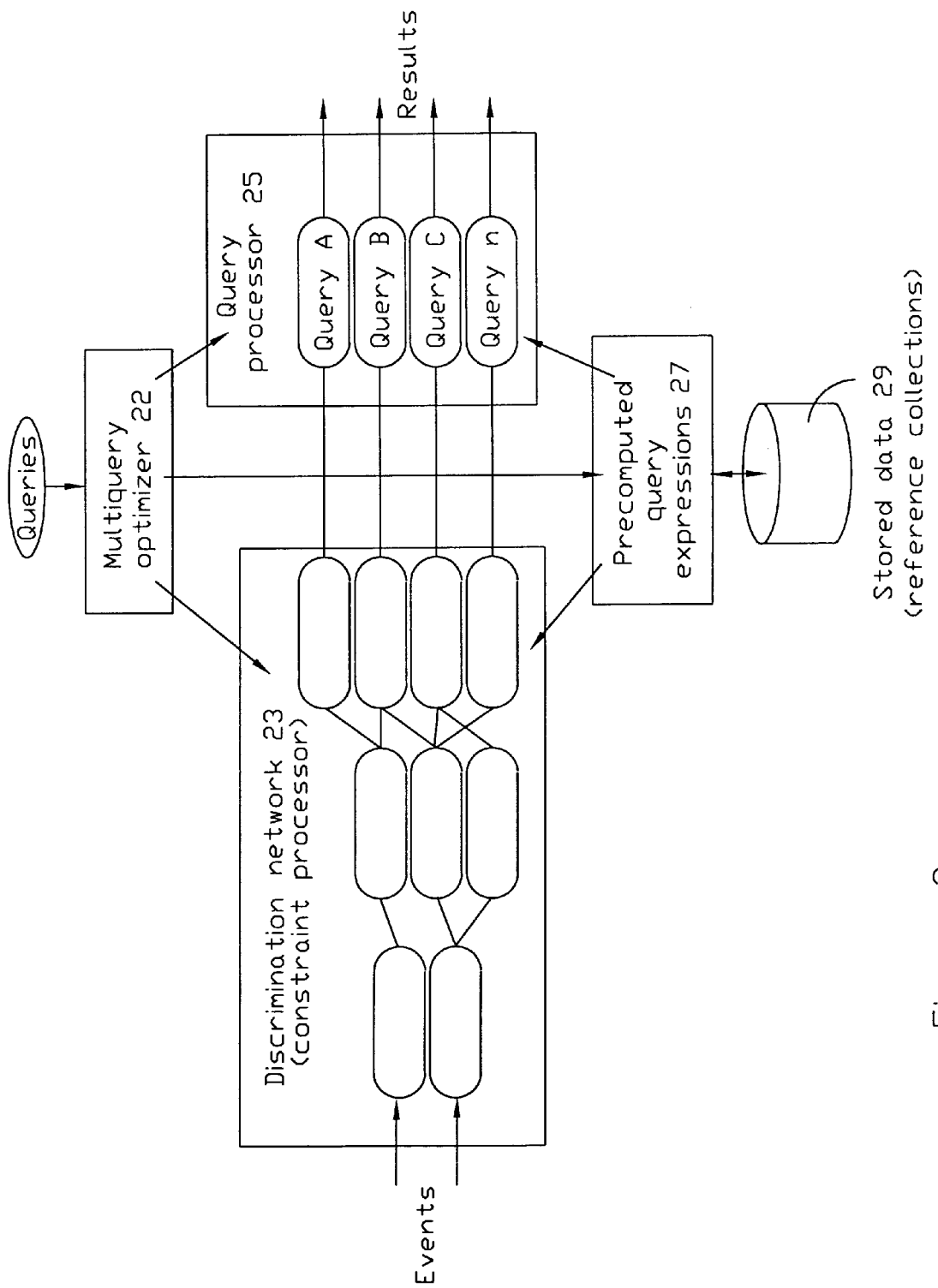
FIG. 2 is a more detailed diagram illustrating a central portion of a real-time decision support system designed in accordance with the present invention.

FIG. 2 is a diagram which illustrates logical elements of a preferred embodiment of a real-time decision support system 10 established by real-time decision support software executing on one or more computers 12. As pointed out above, the real-time decision support system 10 is optimized to respond to all queries which are affected by each sequentially received event. The decision support system 10 includes a query optimizer 22 which receives queries composed by administrators and users. The query optimizer 22 preferably is designed to optimize both (1) the evaluation of sequential events to determine whether the attributes of those events require responses to outstanding queries and (2) the generation of query results in an efficient manner.

Figure 4:
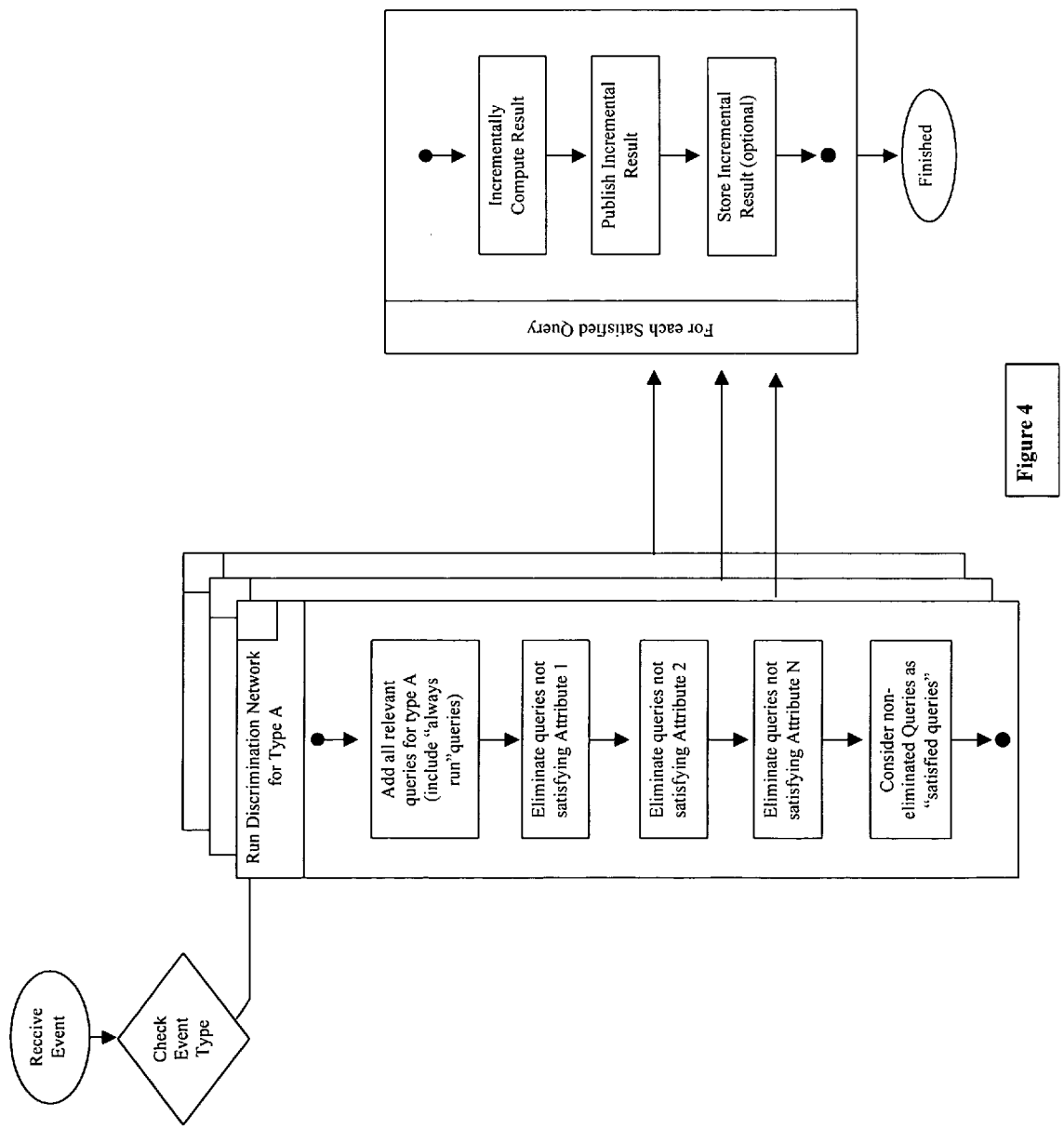
FIG. 4 is a flow diagram illustrating an embodiment of one particular event execution process of the present invention.

The query optimizer 22 optimizes evaluation of queries by first optimizing the response to single queries and then optimizing the handling of simultaneous multiple queries. The query optimizer 22 generates a discrimination network 23 which is designed to evaluate incoming event data to determine which queries are satisfied by the individual attributes of each new event. This network 23 helps to select which queries to run. FIG. 3 illustrates a flow diagram for constructing one embodiment of the invention. FIG. 4 illustrates an embodiment of event processing using the embodiment of FIG. 3. The discrimination network 23 is designed to receive each new event and activate only portions of the discrimination network which are affected by attributes of the new event. An activated portion of the discrimination network 23 applies tests which quickly determine whether the associated query may have constraints which match the attributes of an event.

A system 10 is designed to function in a particular business and thus is aware of the types of events which will be received and of the attributes of such events for such business. For each query which the discrimination network 23 determines may be satisfied by the data of an event, an indication is sent to an incremental query processor 25 which evaluates the results of the event for that query. The incremental query processor 25 (like the discrimination network 23) is designed to work with the algorithms of the query optimizer 22 to optimally process the individual queries posed to the decision support system 10. To enable this to occur, an executable process for determining the results of the query and an empty collection to hold the results of that query are established. The process for each query is optimized where possible in a manner to execute rapidly. When an event occurs, all affected processes of the decision support system 20 are run and provide results for the queries affected simultaneously. The results of each query may be recorded and updated in the query collection as each event occurs where they are available for historical comparisons.

The query optimizer 22 of the decision support system 20 includes a precomputing processor which optimizes results from collections of reference data (reference collections). For the purposes of this invention, reference collections include data which change relatively infrequently and are somewhat limited in nature. Since such collections (stored data 29) change infrequently, optimizations using data from the collections will change only infrequently. The optimizer 22 therefor assumes that the reference collections will not change and generates optimized results for queries from these collections. If a reference collection does change later, then the queries that use the reference collection are reoptimized and the precomputations are redone.

For example, zip codes and cities change infrequently. A query might ask to be informed of all shipments to a particular city while shipment events designate destination by zip code. Rather than having to look up the zip code for an event in a reference collection to determine whether the zip code is one in the desired city, all of the zip codes in the particular city can be precomputed from the much larger reference database including tables of both cities and their zip codes before events arrive.

The query optimizer 22 in the preferred embodiment detects use of reference collections 29 within queries. In the preferred embodiment, the reference collections are noted by a special keyword (a pragma) in the query specification. The optimizer 22 attempts to do as much precomputation using the reference collections as possible and stores the precomputations as precomputed query expressions 27. For example, it precomputes join constraints, detects empty sets for which set membership testing will always be false, and makes similar optimizations known to those skilled in the art. The general process which the query optimizer 22 follows in optimizing queries is (illustrated in FIG. 3) to first parse or break down each new query into its various elements. The following is a pseudo-code example of a query that might be posed to the system:

EXAMPLE 1 select city.name
   sum (package.weight)
from package,
   city pragma[sourcetype="reference"]
where package.weight>100
   and package.service='priority'
   and package.zip=city.zip
   and city.name='Atlanta'

Such a query includes a number of elements. These include a "select" clause which defines the "results" which are to be returned by the query, here the name of the particular city and the sum of the weights of all packages up to that point in the query. A "from" clause defines the sources of data; in the example, "package" and "city" are sources of data. The "city" source is followed by an expression containing the keyword "pragma." The particular pragma expression indicates that "city" indicates a collection (or table) of data stored in the system. In contrast, the lack of such a pragma expression associated with the "package" source means that this source is an "event source" consisting of events furnished in a sequence to the system reporting that packages have arrived. A "where" clause defines a set of constraints that the attributes of the event must satisfy in order to be included in the result for the query.

The above real-time query sums the weight of all packages that are over 100 pounds, are of priority service, and are destined for Atlanta zip codes. This summation is performed continuously and incrementally, based on package events that contain package attribute data, including the package's weight, zip code, service level, and possibly other information. The generation of these package events and their communication are outside the scope of the this invention and could be accomplished by any number of means. A likely means for event generation would be a bar code scanner that reads the package's bar coding, and a likely means for event communication would be a publish-subscribe event service, as described previously.

Processing of the example proceeds as follows. As each package event arrives, the attributes of the event are tested against the constraints in the where clauses, namely, that the weight is over 100 pounds, that the service is of the "priority" level, and that the zip code is in the city of Atlanta. If all of these constraints are true, then the package event is considered to have satisfied the query, and the incremental result is computed by adding the weight of the package to the current running total of package weights.

In general, a real-time decision support system will contain many different real-time queries over many different event types and data collections. Each time an event arrives, the system computes the new incremental result of each and every query whose constraints are satisfied by the event data.

The simplest method for real-time query processing, herein referred to as the "Brute-Force Method," is described below:

Brute Force Algorithm for Real-time Query Processing when an event arrives:
  Step 1: Test for query satisfaction.
  for each query known to the system:
    test if the event data satisfies the constraints specified in the query's where clause
    if so, then include the query in the set of satisfied queries
  Step 2: Compute the incremental query result.
  for each query in satisfied queries, compute the increment query result by:
    computing from scratch the new query result based on current event data and all previous events, and
    taking the difference of the new result and the previous result to compute the incremental difference The Brute Force Algorithm depicts, at a general level, the process steps that occur in a real-time decision support system whenever an event is received. First, the set of queries satisfied by the event data are determined. Second, for each satisfied query, the incremental query result is computed.

The Brute Force Algorithm always yields the correct result, but it is very expensive. As a consequence, it is of limited practical use. The invention includes a number of improvements, generally referred to as "optimizations," that greatly improve the performance and efficiency of real-time query processing, thereby making it practical over a large set of realistic problems.

Many of the deficiencies of the Brute Force Algorithm, as well as the potential optimizations, can be illustrated by applying it to the example query. Consider the processing that occurs when an event is received by a real-time decision support system 10 that contains the example query and many other similar queries. If the event is a "package event" or a "city event," that is, an event that conveys a change in the city database table, then the event is relevant to the query in the sense the event could possibly affect the result of the query. However, if the event is a different type of event, for example, a flight-change event, then the event is not relevant to the query, in the sense that the event can not influence the query result. Note that only event types that are declared in the "from clause" of the query can be used in other parts of the query, including the "where clause" and the "select clause." Hence, a system only need examine a query's "from clause" to determine if the query is relevant to an incoming event of a given type. An important optimization is to test only relevant queries.

Another type of optimization relates to "null queries," which are defined to be queries known to have a null result, in the sense that no event could satisfy the query. Returning to the above example query, consider the scenario where the city table contains no zip codes to Atlanta, because, for example, package service to Atlanta has not yet begun, so no Atlanta zip codes have been recorded in the table. In this case, no package event can ever satisfy the query constraints, hence, the query result will always be empty. When identifiable in advance, such null queries can be removed from consideration. Note that the example query will be considered a null query only as long as no zip codes exist for Atlanta in the city table. If Atlanta zip codes are added to that table because, for example, package delivery service to Atlanta has been initiated, then the example query would no longer be a null query. As explained below, such changes can be detected and handled by the query processing algorithms.

When an event is received, it is tested against potentially many queries, and these queries may have overlapping or mutually exclusive constraints in their "where clause." The category of optimizations termed "multi-query" optimizations attempt to optimize the testing of related constraints across multiple queries. Consider the above example query together with a similar query that is identical except it tests for "normal" service instead of priority service. These two queries have mutually exclusive constraints over the "service" attribute within the package event. During the course of query processing, if it is found that one of the queries is satisfied, then there is no need to consider the other query.

Another type of query optimization involves subqueries over reference collections consisting of one or more constraints. Note that reference collections are assumed to change slowly, especially, with respect to event generation. Hence, an optimization strategy is to pre-compute the results of such subqueries, cache the result, and then substitute the cached result at query execution time. In the example, the subexpression "package.zip=city.zip and city.name='Atlanta'" contains a subquery over the reference collection "city." This subexpression can be re-formulated as "package.zip=(select city.zip from city where city.name='Atlanta')", where the subquery is explicitly depicted between the parenthesis. Executing this subquery would return all the zip codes in Atlanta, and this result could then be tested against the package's zip code. Since Atlanta's zip codes change infrequently, it is substantially more efficient to compute them once, and cache the results, then to re-compute them for each incoming event.

The preferred embodiment of the invention applies a number of optimizations to real-time query processing, so as to greatly improve its query performance over the Brute Force Algorithm. These generally fall into three categories of optimization. The first category optimizes the constraint satisfaction testing of a query independent of other queries. These are referred to as "single-query optimizations," and they include the null-query optimization and the pre-computation optimizations discussed above. The second optimization category optimizes constraint satisfaction testing across multiple queries that may be active at the same time. Such optimizations are referred to as "multi-query optimizations." The third optimization category optimizes the computation of the incremental query results and is referred to as an "incremental processing optimization."

When a query is received by the system 10, the query is parsed and optimized prior to the processing of any events affecting that query. As will be made clear from the following discussion, these optimizations affect the establishment of the discrimination network 23, the incremental query processor 25, and the pre-computed subquery results 27. After the query is parsed and optimized, an "execution plan" is generated for each event type that has been declared in the query's from-clause and, hence, could affect the query's result.

Query optimization strategies and event execution plans depend on the complexity of the query. Queries can be grouped into three different levels of complexity. The first level, called "simple queries," refers to queries that have a single source as identified in the from-clause. These have also been referred to as "filters" in the prior art.

The second level, called "univariate queries," refers to queries that have exactly one event source and one or more reference sources. Example 1 is such a query, having "package" as its one event source and "city" as its only reference source.

The third level, called "multivariate queries," refers to queries with two or more event sources. Multivariate queries may also have zero, one, or more reference sources.

Query optimization is illustrated in FIG. 3. The first step in the optimization of a newly submitted query is to parse it and to determine whether the query is syntactically correct for the query language utilized. If it is not, then the query is rejected.

The second step is to check the query for semantic correctness. For example, where the query's where-clause includes a range constraint and the limits of the range are constants such that nothing could fall into the range, the constraint is impossible for the attributes of any event to meet. The query is then flagged as being "always null" and is not considered further.

The third step in query optimization is to perform the single-query optimizations. Among the single-query optimizations that are especially effective are the precomputation of constraints involving reference collections of data. As mentioned above, the query optimizer 22 has the capability to precompute subqueries (27) involving collections of reference data. In Example 1, the query requires that a table be searched to determine those zip codes which are in a desired city, a process which would normally slow the processing in response to an event. However, since the city table, as any reference source, is considered to be relatively unchanging, the zip codes for the desired city can be determined at the time when a query is received, and then cached in memory for retrieval and constraint testing when an event is received.

Thus, the exemplary expression can be collapsed to provide an expression "where package.zip=(actual numbers which represent the set of Atlanta zip codes)". To do this may require that a new collection be computed at the time of optimizing the query which includes only attributes asked for by the query. Consequently, the precomputing process carries out functions required by constraints related to reference data and caches the results for use by both the discrimination network 23 and the incremental query processor 25 to rapidly derive results without the need to search an entire database. Precomputing such reference results makes operations of the decision support system much faster.

Another group of single-query optimizations involve re-ordering commutable subexpressions and replacing subexpressions with logically equivalent but simpler subexpressions. In processing queries in the embodiment being described, ranges expressed as two constraints may be replaced with a single interval test. For example, the subexpression "package.weight >=5 and package.weight <=100" may be replaced with the simpler interval expression "package.weight in interval(5,100)".

Many optimization techniques require that the query first be placed into a normal form. The normal form used in one embodiment eliminates expressions within where-clauses containing "or". Specifically, a query which contains an "or" in its where-clause is treated as multiple queries; and their results are combined to yield the equivalent result as the original query. This, in effect, provides multiple entry points to the constraint satisfaction testing for that particular query.

Normal form queries, by definition, do not contain "or" expressions. This simplifies constraint testing because a normal form query fails if any of its constraints fail. Hence, the query need not be evaluated further with respect to an arriving event.

In optimizing a normal form query, one of the primary criteria is to optimize the order in which constraints are checked. Specifically, if one constraint of the where clause is more likely to fail, then that constraint should probably be tested first. Exclusion by failing the first constraint test means that query can be eliminated for consideration and, hence, less work has to be done by the system in processing that event.

For optimizing the order of constraint checking, the notion of "selectivity" is used. For an attribute, "selectivity" measures the ratio of distinct values of an attribute to the size of the entire collection. Hence, it measures the uniqueness of a given attribute within a collection. For example, among the world population of people, hair color is of low selectivity, since there are only a few colors of hair among a huge population and, consequently, a large number of people share the same hair color. In contrast, fingerprints are highly selective since an individual's fingerprints are unique.

Constraints can be assigned a "selectivity" based on a combination of the selectivity of the attribute being tested and the selectivity of the test itself. Equality testing is highly selective; while inequality and range testing are of low selectivity. The selectivity for testing set membership is dependent on the ratio of the size of the set being tested versus the number of distinct values in the collection.

In one embodiment, a query is optimized by testing the constraints in the query's where-clause in order of decreasing estimated selectivity. In this manner, a constraint which is very selective may be first tested to eliminate a particular query without the need to test other less selective constraints of the query. The order of testing of a single query's constraints is referred to as a "decision tree."

The decision tree is constructed as follows. The first constraint of the where clause which is an equals compare is selected as a first entry point for the tree. If none exists, then the first attribute of the where clause which is a set membership test is selected as an entry point for the tree. If none exists, then the first comparison of an attribute to a literal is selected as an entry point. If a clause being considered includes an "and" expression, the branch including the attribute being considered is selected. If any of these tests are met, then an entry point for the query is selected. Having selected an entry point, the next node of the decision tree is selected using a similar selection process. The construction of the decision tree continues until there are no more constraints under consideration.

In constructing the decision tree for the query, if all of the tests for optimization fail, then there is no reason to optimize the query, and it is classified as an "always run" query.

Once the single-query optimizations are performed, the next step is to perform the multi-query optimizations. For each event type, the relevant queries are identified and considered as a group for the purposes of multi-query optimization. Hence, multi-query optimizations are computed per event type, and a query that has several distinct event types as sources, will participate in several multi-query optimization computations, one for each source event type.

In one embodiment, an index structure is built for each event type over one of the attributes in the event type. This attribute is referred to as the "index attribute." The index attribute is chosen to be the attribute referenced in the largest number of constraints of high selectivity across all relevant queries, where a constraint is considered to be of high selectivity if it participates only in constant constraints involving equality or set inclusion.

The index structure that is built is a special kind of index structure referred to as a "constraint index." A constraint index enables the system to quickly look up the index attribute by value and to obtain a list of all relevant queries that have a corresponding constraint that is satisfied whenever the index attribute has a given value.

The set of all queries whose constraints are tested by a given constraint index is called the index's "query set." An index's query set need not include all relevant queries, since some relevant queries may not contain a constraint that is tested by a particular index. For example, a query that contains no constraint over the index attribute would not be included in that index's query set.

Constraint indices are fundamentally different from the "record indices" maintained by traditional database systems. In contrast to a constraint index, which yields a set of queries with constraints satisfied by a particular value of the index attribute, a record index yields the set of data records containing a particular value of the index attribute. Hence, the index structures used by a real-time decision support system are fundamentally different from the index structures used by traditional database systems.

Once the constraint index is constructed for a given event type, the decision tree for each query in the index's query set is modified to remove constraints that are effectively tested by the constraint index. The resulting "modified decision tree" for that query is now specific to the given event type. Since a query may be relevant to multiple event types, a query may as a consequence have multiple associated modified decision trees, one for each event type for which it is relevant.

For each event type, a constraint index is typically built, but this is not a requirement. Some event types many not merit a constraint index because they lack a sufficient number of constraints of high selectivity. In those cases, no constraint index is built and the decision trees computed during single-query optimization will be used unmodified. The entire structure comprising an optional constraint index for each event type and associated decision trees, modified appropriately, is referred to as a "discrimination network" (depicted as 23 in FIG. 2).

Once multi-query optimization is completed, the final step in query optimization is to optimize the incremental processing of a given query. Incremental query optimizations are dependent on the complexity of the query as well as on the complexity of the result-expression.

For a simple query with no functions in the result expression, either the incoming event satisfies the query's constraints, in which case, the event is included in the result set, or it does not, in which case the event is excluded from the result set. For an included event, the result clause may specify only a subset of its attributes, rather than the entire event.

For a simple query with unary functions, the incremental result computation is slightly more complex. The unary functions, such as to invert the sign of a number or to take the absolute value of a number, are computed as part of the result. However, this computation can be based strictly on information contained in the event. Specifically, no intermediate results need to be computed or cached and remembered from one event to the next.

On the other hand, if a simple query contains aggregation functions in its result expression, then intermediate results need to be cached and stored in order to process them efficiently. The nature of the intermediate results can be inferred from the aggregate operation. For example, if the result expression calls for computing the average of an attribute, then a count of the number of distinct events received plus the running sum of the values of that attribute are maintained as intermediate results.

An univariate query can be treated as simple query with respect to the event type over its single dynamic source. All other event types are, by definition, over the query's reference collections. In such cases, the query optimizer runs a re-optimization process described subsequently.

A multi-variate query requires an incremental processing approach that is altogether different from the approaches used for simple and univariate queries. Because of their complexity, multi-variate queries do not lend themselves to the incremental processing techniques described previously. Instead, the incremental processing algorithm given in the Brute Force Algorithm can be used for these queries.

As may be seen, when the query optimization process has been completed, events may be very rapidly handled in the manner illustrated in FIG. 4. As an event arrives, the type of event is determined. Then, the discrimination network is executed for that event type. The discrimination network efficiently tests the constraints of the relevant queries (and only the relevant queries) for that event type. It yields the set of satisfied relevant queries. Then, for each satisfied query, its incremental query processing strategy is run, yielding its incremental result, which is then published. Finally, the "always run" relevant queries, which are queries that could not be optimized by the query optimization techniques described above, are processed using the Brute Force algorithm and their results are published.

The above-described optimizations and execution plans determine the steps by which the real-time decision support system accomplishes its operations. However, in contrast to a typical database system, which optimizes constraint satisfaction over a data set in response to a query, the present invention optimizes constraint satisfaction over a set of queries in response to an event. In effect, the operations of a traditional database are turned inside out.

Furthermore, the query optimization processing described above greatly increasing the speed of processing over the Brute Force Algorithm. First, for an incoming event, only the relevant queries are considered, the remaining queries are simply ignored. Second, many of the relevant queries can be efficiently tested for satisfaction using the discrimination network described above. This quickly eliminates those queries that will not be affected by the incoming event because the values of event's attributes do not satisfy the query constraints. Third, for most categories of queries, efficient incremental processing techniques can be applied that do not require the entire query result to be recomputed as with the Brute Force Algorithm.

One problem that arises with pre-computation optimizations is that such optimizations are based on the assumption that reference collections do not change. If a reference collection does change, the assumptions made in the optimizations may or may not be correct. For example, a determination that a particular constraint test should be an entry point because it is more selective than other constraint tests may not longer be true if the constraint test involved the result of a pre-computed subquery. Consequently, the entire optimization structure needs to be dismantled and restructured if a change to a reference collection occurs.

To cover this eventuality, the present invention includes means for detecting changes to reference collections and taking steps to assure that the changes do not cause incorrect information to be provided to users. To this end, the system includes means for responding to a change in a reference collection by temporarily suspending the processing of events, dismantling the optimizations that have been formulated prior to the change in the reference collection, recovering from side effects of the change without losing data or queries, and reoptimizing queries to take account of the change in the reference collection.

The manner in which this is accomplished obviously depends on the optimization structure that has been created to handle queries prior to the change. However, by keeping a history of the optimization process, the details of the optimizations accomplished may be eliminated by walking backward through the history. During this period and the succeeding recovery and reoptimization, the system suspends the processing of incoming events.

Once the old optimizations have been eliminated, the system provides for recovering without the loss of input or query data. This it accomplishes in one embodiment by switching to a non-optimized algorithm devised to execute the query, computing the changes, and then reoptimizing. The non-optimized algorithm computes the query result both prior to the reference collection change (if it is not already cached) and after the reference collection change. In this way, it acts much like a more common way to run queries: it runs the query over all data rather than having an incremental algorithm. After computing and publishing the changes, the optimizer is used to reoptimize the query.

Finally, the system proceeds to reoptimize each of the queries existing in the same manner as though the queries has just been received. Once this has been accomplished, the normal processing of events may resume, in the order in which the events were received.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer-implemented real-time decision support system comprising:
   means for receiving complex queries posed by a plurality of users;
   means for providing for each of the queries an executable query process furnishing a result when data sources satisfy constraints of the query;
   means for providing data sources, the data sources including an event source;
   means for responding to an event furnished by an event source to initiate execution of all query processes having constraints satisfied by data sources; and
   means for furnishing results of executed query processes to users.

2. A system as claimed in claim 1 in which the means for responding to an event comprises means for providing an index for testing whether constraints of a query process match attributes of events.

3. A system as claimed in claim 1 in which all query processes having constraints matching attributes in an event are executed simultaneously.

4. A system as claimed in claim 1 in which a query process is persistent until removed.

5. A system as claimed in claim 1 in which the means for providing for each of the queries an executable query process includes means for changing the query processes for which results are required.

6. A system as claimed in claim 1 in which the means for furnishing results of executed query processes to users comprises means for providing results to users whenever incremental changes in query results occur.

7. A system as claimed in claim 6 in which the means for providing results to users whenever incremental changes in query results occur includes means for determining incremental changes in query results.

8. A system as claimed in claim 1 in which the data sources comprise an event service.

9. A system as claimed in claim 1 in which the means for furnishing results of executed query processes to users comprises an event service.

10. A system as claimed in claim 1 in which the means for providing data sources comprises means for providing historical data.

11. A process for providing the incremental results caused by incrementally-occurring changes in data to complex queries comprising the steps of:
    receiving complex queries posed by a plurality of users,
    generating an executable query process for providing results required by each of the queries,
    receiving data including events from data sources,
    responding to events by executing all query processes having constraints satisfied by data sources to provide results required by each of the queries, and
    furnishing results of executed query processes to users.

12. A process as claimed in claim 11 in which the step of responding to events comprises testing whether constraints of a query process are satisfied by attributes of events.

13. A process as claimed in claim 11 in which all query processes having constraints satisfied by data sources are executed simultaneously.

14. A process as claimed in claim 11 in which a query process is persistent until removed.

15. A process as claimed in claim 11 in which the step of generating an executable query process includes a step of changing the query process for which results are required while the process is functioning.

16. A process as claimed in claim 11 in which the step of furnishing results of executed query processes to users comprises a step of providing results to users whenever incremental changes in query results occur.

17. A process as claimed in claim 16 in which the step of providing results to users whenever incremental changes in query results occur includes a step of determining incremental changes in query results.

18. A process as claimed in claim 11 in which the step of receiving data including events from data sources utilizes an event service to furnish events.

19. A process as claimed in claim 11 in which the step of furnishing results of executed query processes to users utilizes an event service.

20. A computer-implemented process as claimed in claim 11 in which the step of receiving data including events from data sources includes receiving historical data from a source of historical data.

* * * * *